United States Patent [19]
Flemming et al.

[11] Patent Number: 5,638,427
[45] Date of Patent: Jun. 10, 1997

[54] OPERATOR-CONTROLLED INTERACTIVE COMMUNICATION DEVICE

[75] Inventors: Richard W. Flemming; Donald L. Wegeng, both of Rochester; Everett W. Jenkins, Webster, all of N.Y.

[73] Assignee: Xerox Corporation, Stamford, Conn.

[21] Appl. No.: 269,599

[22] Filed: Jul. 1, 1994

[51] Int. Cl.$^6$ .................... H04M 11/00; G03G 21/00
[52] U.S. Cl. .................... 379/96; 379/106; 379/102; 399/1; 399/8
[58] Field of Search .................... 379/96, 98, 106, 379/107, 102, 104, 105, 94, 93, 100, 90, 91, 110; 355/202, 203, 204, 205, 206, 207, 208, 209; 358/442

[56] References Cited

U.S. PATENT DOCUMENTS

| | | |
|---|---|---|
| 3,739,338 | 6/1973 | Jacobson et al. . |
| 4,086,434 | 4/1978 | Bocchi . |
| 4,499,581 | 2/1985 | Miazga et al. . |
| 4,549,044 | 10/1985 | Durham . |
| 5,173,935 | 12/1992 | Meschi . |
| 5,216,461 | 6/1993 | Maekawa et al. . |
| 5,220,380 | 6/1993 | Hirata et al. ................ 379/96 |
| 5,224,157 | 6/1993 | Yamada et al. ............. 379/106 |
| 5,305,055 | 4/1994 | Ebner et al. . |
| 5,305,199 | 4/1994 | LoBiondo et al. . |
| 5,325,156 | 6/1994 | Ulinski .................... 355/209 |
| 5,394,458 | 2/1995 | Allen et al. ................ 379/106 |
| 5,404,199 | 4/1995 | Hirata et al. ............... 379/96 |
| 5,434,650 | 7/1995 | Nakahara et al. ........... 355/202 |
| 5,434,911 | 7/1995 | Gray et al. ................ 379/106 |

*Primary Examiner*—Stella L. Woo
*Attorney, Agent, or Firm*—Fay, Sharpe, Beall, Fagan, Minnich & McKee

[57] ABSTRACT

An operator controlled interactive communication device having a display for receiving or displaying messages internally generated and received from external sources. A communication transmission interface which is selectively connected to a telephone handset connector, a computer connector and a modem to allow multiple modes of communication between an operator at a customer site and a vendor site. The communication device is reprogrammable from a remote location or through the computer connector.

15 Claims, 5 Drawing Sheets

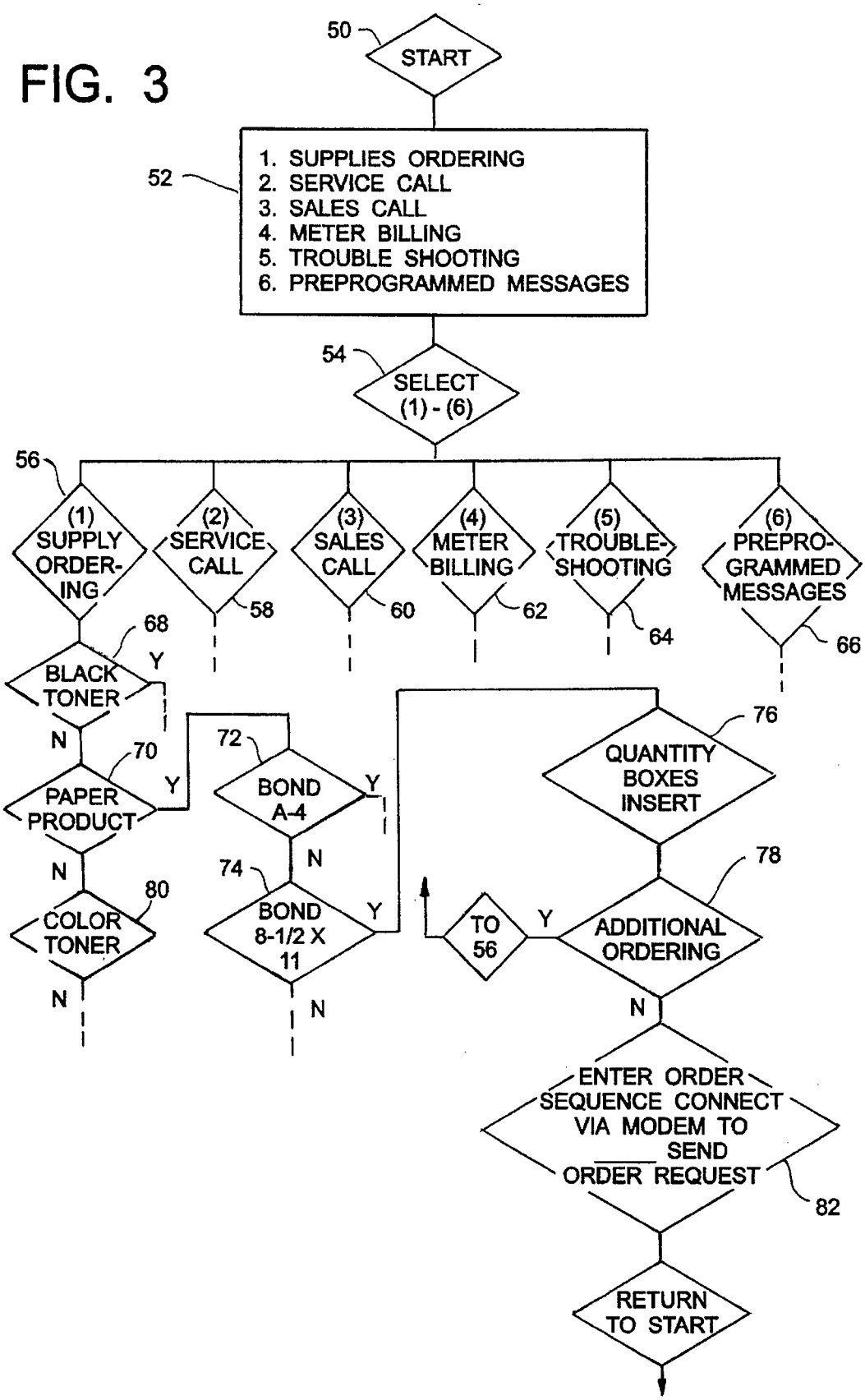

```
SELECT TOPIC OF INTEREST:

1. ORDER SUPPLIES
  2. PLACE SERVICE CALL
  3. PLACE SALES CALL
  4. ENTER METER BILLING
  5. MACHINE TROUBLE-SHOOTING
  6. SELECT PRESTORED MESSAGES

SELECT NUMBER: 1
  SELECT ENTER
```

FIG. 4a

```
SELECT SUPPLY TO BE ORDERED:

1. BLACK TONER
  2. PAPER
  3. COLOR TONER
  4. OTHER SUPPLIES

SELECT NUMBER: 2
  SELECT ENTER
```

FIG. 4b

```
SELECT PAPER TYPE AND SIZE:

1. BOND A-4
  2. BOND 8-1/2 X 11
  3. BOND 11 X 14
  4. BRIGHT WHITE A-4
  5. BRIGHT WHITE A-4
  6. BRIGHT WHITE 8-1/2 X 11
  7. BRIGHT WHITE 11 X 14
  8. NEXT SCREEN FOR ADDITIONAL
     CHOICES

SELECT NUMBER: 2
  SELECT ENTER
```

FIG. 4c

```
SELECT QUANTITY OF ORDER:
   1. 500 SHEET BOXES
   2. 1,000 SHEET BOXES
   3. ADDITIONAL ORDERING SIZES

SELECT NUMBER: 1
SELECT ENTER
```

FIG. 4d

```
SELECT NUMBER OF BOXES:

ENTER NUMBER: __
SELECT ENTER
```

FIG. 4e

```
ORDERING ADDITIONAL SUPPLIES:
   1. YES
   2. NO - SEND ORDER
   3. CANCEL ORDER RETURN TO START

SELECT NUMBER: __
SELECT ENTER
```

FIG. 4f

OPERATOR-CONTROLLED INTERACTIVE COMMUNICATION DEVICE

BACKGROUND OF THE INVENTION

The present invention relates to the electronic communication arts and more particularly to an operator controlled interactive communication device for communication between a customer installation site and a vendor of copying/printing machines.

Patents have issued regarding transmission to a remote location, data which reflects the operation of a copying or printing machine. For instance, U.S. Pat. No. 5,216,461 to Maekawa, et al. is directed to a copying machine controlling system for performing information communication. The system is capable of making communication between data terminals and a centralized unit by voice or facsimile communication. The centralized control apparatus which receives data related to the plurality of copying machines through a communication network also controls each of the copying machines. The system includes receiving means for receiving count data of the number of copies in the plurality of copying machines, totalizing means for totalizing the received count data for each copying machine, storing means for storing a telephone number of a facsimile apparatus provided corresponding to each of the copying machines, and transmitting means for transmitting image data based on the totalized count data to each facsimile apparatus provided corresponding to each of the copying machines.

Another U.S. Pat. No. 5,305,199 to LoBiondo, et al. is directed to a reprographic machine which includes an inventory tracking system for monitoring consumable supplies. Usage data from a plurality of network reprographic machines are supplied to a single tracking system for monitoring inventories of supplies consumed by the network. Automatic or semiautomatic ordering can be provided via a remote interactive communication system. Order conformation, projected shipment dates and shipment conformations can be provided from the reorder site.

Additionally, other patents have been issued in other areas which include remote monitoring. Bocchi, 4,086,434, receives information from sensors in order to initiate calls to a central office at predetermined intervals such as reporting utility usage including, time of day power usage metering. This system also describes automatic initiation of a call to appropriate authorities, i.e., fire department, police department, etc. in response to an alarm condition.

A common feature among the known art is that the device monitors the internal functioning of the machine or system under consideration. Particularly, with attention to copy machines and printers the disclosed devices receive data from internal diagnostic tests and/or sensors and transmit this data to a remote communication site. For instance, in LoBiondo, et al. the communication system receives data from a tracking system both of which are internal to the machine. Machines such as that set forth in LoBiondo, et al. incorporate communication capabilities commonly known as remote interactive communication (RIC) systems. In a RIC system deviations in performance of key parameters are detected, an expert system makes an analysis of the situation and transmits a service alert, including recommended solutions, to an appropriate service technician. The technician will then schedule, in advance, a site visit before the problem becomes severe enough to warrant a system shutdown.

Machines having systems which perform self-diagnostic tests and which have the capability of transmitting the resultant data to sources external of the machine are found in high-end, high volume copying environments. These machines are expensive and therefore prohibitive to users who require only low volume production capabilities. Particularly, offices which do not require high volume copying or printing would not find it economically justifiable to purchase a high-end reproduction machine or printer including remote interactive communication (RIC) or systems with similar capabilities. It would also not be economically justifiable to attempt to modify these machines to incorporate RIC type technology. This known technology also does not address a situation to improve the efficiency of communication between the customer's installation and the vendor, when a technician of the vendor is at the customer's installation.

Therefore, while including the capability of a RIC system in reproduction or printing machines might be desirable there are numerous situations where machines without such capabilities are in place and operating. The present invention is directed to these situations.

Currently, a customer will communicate with a vendor of one of these machines for several reasons. A customer may request a service call, and later a technician may notify the customer of technician's estimated time of arrival. The customer may also contact the vendor to order supplies, request a sales call, and to send billing meter readings. All but the last of these require a voice telephone (billing meter readings for machines that are not RIC enabled may be mailed to the vendor). Communication via the telephone for the above situations is undesirable for several reasons. Particularly, voice communications are inherently inefficient, they are real-time oriented, requiring the customer to wait until a representative of the vendor is available, it is also often difficult and sometimes impossible for the customer to accurately describe a problem in terms that a technician can use to diagnose the problem. A customer must also remember one or more telephone numbers (i.e. for service, sales and supplies ordering). Additionally, when the vendor wants to contact the customer, the phone is again used which thereby interrupts the customer from their normal daily business activities. If such a call was to simply notify the customer the time of the technician's arrival this interruption is undesirable from the customer's point of view. Lastly, the use of the mail to send billing meter readings is quite slow and unreliable.

The present invention, therefore, proposes a communication device to overcome the above deficiencies and others in an economical manner for machines which do not have remote interactive communication capabilities designed therein. In another embodiment the subject invention includes a construction which allows the subject invention to work with a machine having remote interactive capabilities and expands the usefulness of such machines.

SUMMARY OF THE INVENTION

The invention provides an operator controlled interactive communication device for copy machines and printers having no interactive capabilities. The invention includes an alphanumeric display for interacting with customers and displaying messages from the vendor. The device is connected to a telephone or other communication line. It includes a telephone handset connector to permit a technician to attach a telephone handset in order to communicate with off-site locations such as a vendor's office. A computer connector also provides a manner of communication with the vendor's office. The device further includes the capability of programming the subject communication device through the computer as well as from a remote location over the telephone access lines to reprogramming of the parameters of the devices.

In another embodiment, a phone line connection for a remote interface communication system is provided for machines having such capabilities.

BRIEF DESCRIPTION OF THE DRAWINGS

For a better understanding of the present invention, reference may be had to the accompanying drawings, wherein the same reference numerals have been applied to like parts and wherein:

FIG. 3 is a flow chart for programs stored and used according to the present device; and FIGS. 4a–4f are a series of screen displays corresponding to the flow chart of FIG. 3.

DESCRIPTION OF THE PREFERRED EMBODIMENTS

Figure 1:
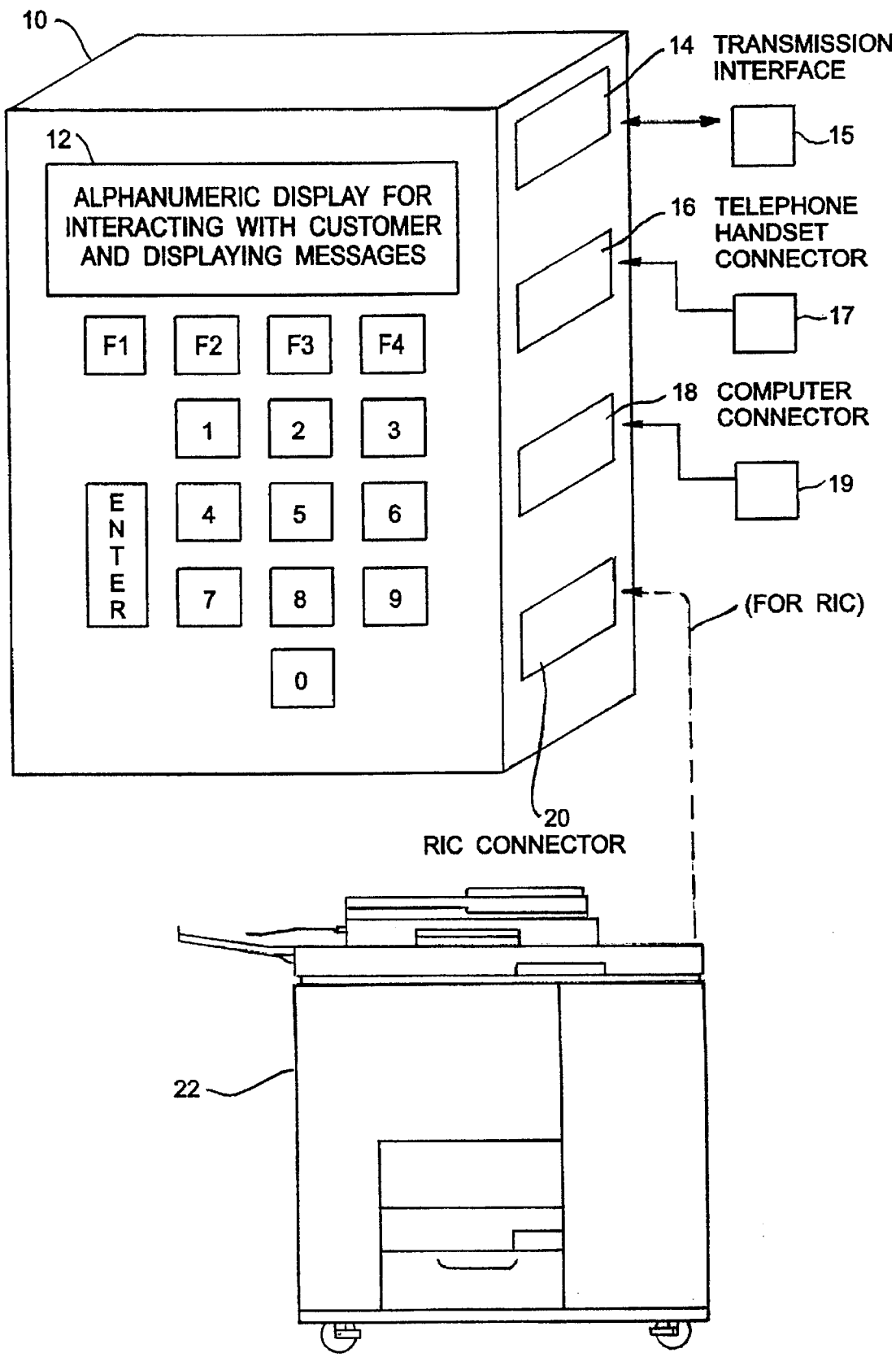
FIG. 1 is a three-dimensional schematic view of an operator controlled interactive communication device of the present invention.

Referring to FIG. 1, an operator controlled interactive communication device 10 according to the present invention is depicted. The device 10 includes an alphanumeric display 12 which may be a liquid crystal display or other type of display using flat screen technology. On the face of the communication device 10 are input keys F1–F4, 0–9 and an ENTER key. It is to be appreciated other forms of input are anticipated including voice and pen-based input schemes. Device 10 is configured with a communication transmission interface 14 to connect device 10 to a transmission medium 15 such as a telephone line, cable line, lines from other utility companies or for RF communication; a telephone handset connector interface 16 for connection of a telephone handset 17; and a computer connector interface 18 for connection of a computer such as a portable or lap-top type 19. It is to be appreciated that the communication transmission interface 14 can, in another embodiment, be configured to have RF communication capabilities including accessing to cellular systems. In another embodiment a RIC (Remote Interface Communication) connector 20 may be included when appropriate technology is integrated into a reprographic machine 22 associated with the operator interactive communication device 10. The reprographic machine 22, such as an electrophotographic machine, an ink jet printer, etc., produces hard copies of documents by applying marking materials, such as electrostatic toners or inks, to recording media such as paper sheets.

As detailed in FIG. 1, there is no necessity that communication device 10 be integrated in or connected to the reprographic machine 22 with which it is associated. In fact it is contemplated that in the majority of applications reprographic machines 22 associated with communication device 10 will lack the capability of outputting data to an external source. Rather reprographic machines 22 which will be associated with communication device 10, may have on-board diagnostic testing capabilities but it will not have any port by which such data may be transmitted. One type of self testing for reproduction machines is disclosed in U.S. Pat. No. 4,499,581, the disclosure of which is incorporated therein by reference.

Therefore, in the present invention an operator can review data or messages generated within the reprographic machine 22 and displayed via a display located on the machine 22, and can then use this information to provide input to communication device 10. This data can then be forwarded to a predetermined off-site location. The communication device 10 will include suitable hardware and software to connect device 10 to a public switched telephone network. Alternatively, communication device 10 can communicate via dedicated telecommunication system or other form of data transmission system. When received by the off-site location the data will be forwarded to the appropriate parties such as a service technician, sales representative or billing department. Alternatively, the device can be configured to contact each appropriate party directly. Numerous, configurations at the off-site location are envisioned to enable communication, including a computer with a modem. The computer would drive a display and/or a printer to provide a hard copy of the received messages. An input device would be used to allow for transmission of messages to the customer's site. The communication device 10 is powered by connection to common wall outlets or may be configured to tap into the power supply of a monitored or associate reprographic machine 22.

Communication device 10 located at a customer site, and is used for all communications between the customer and the vendor that do not require real time interaction. For example, the service technician might still need to call the customer to ask specific questions. This device allows the customer to input information about a problem, or to input information about a supply order, and then walk away while the device contacts the appropriate vendor's representative. The vendor can also send status information, which is either specific to a machine or more general in nature to the device 10 where it is displayed for review by an operator.

Figure 2:
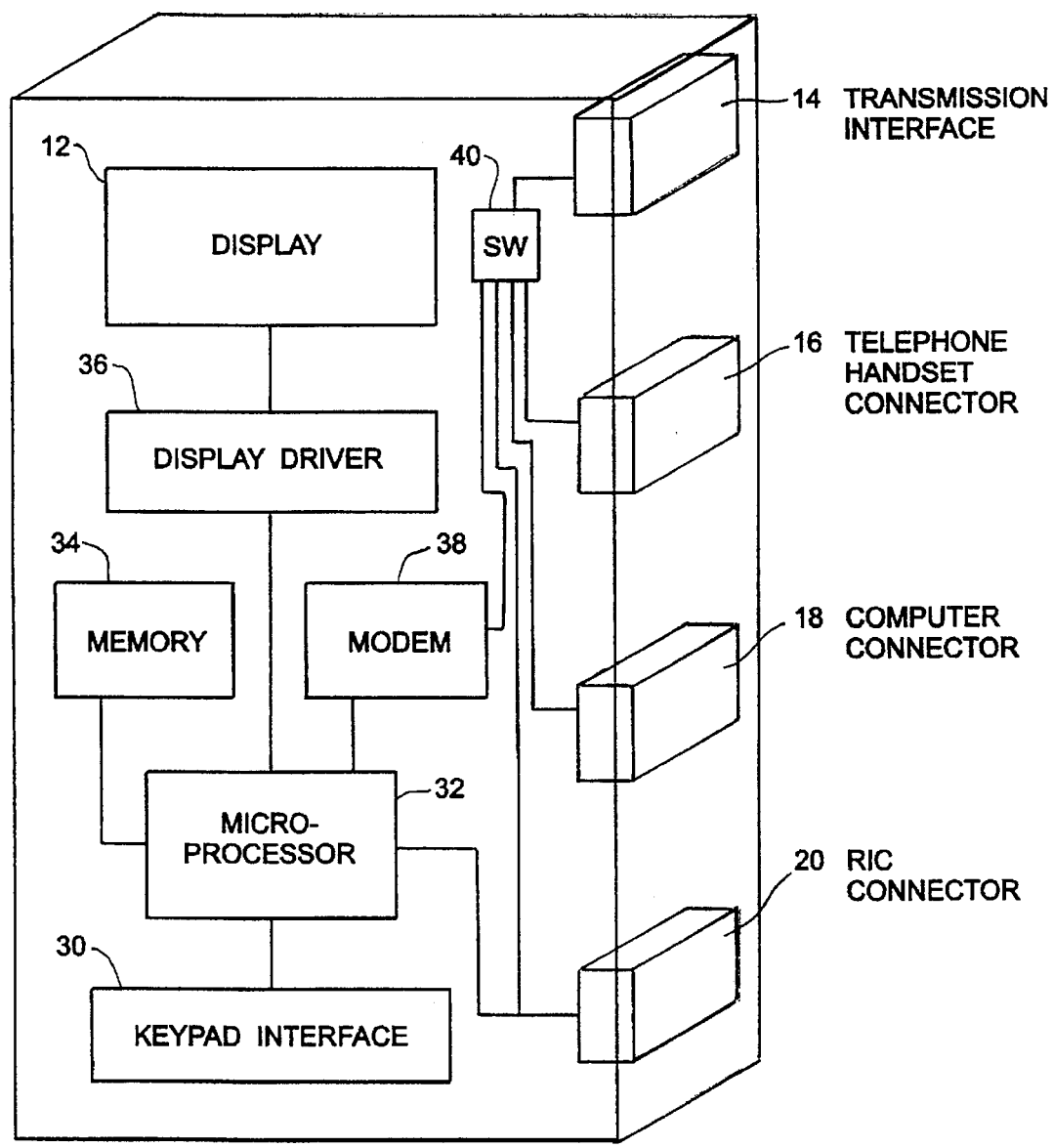
FIG. 2 is a block diagram of internal elements included in the interactive device of FIG. 1.

FIG. 2 sets forth a block diagram of internal elements included in communication device 10. A keypad interface chip 30 constantly scans circuits leading to the input keys. It detects an increase or decrease in current from a key that has been depressed. By detecting either an increase or decrease in the current, the keypad interface 30 can determine both when a key has been pressed and when it has been released. When an appropriate signal from the keyboard has been detected the signal is translated into an ASCII code which stands for a character or into a special code for a function key such as those on the face of communication device 10. These inputs from the input keys translated by the keypad interface 30 are used by microprocessor 32 to access data stored in reprogrammable memory 34 internal to the communication device 10. The stored data includes programs which generate menus to assist the operator in the sending of messages. Also, messages may be received from the vendor over the telephone line through communication transmission interface 14 and through modem 38 which may be hardware or software implemented. These messages and menus are displayed on display 12 by use of display driver chip 36.

Modem 38, telephone handset connector 16 and computer connector 18 are interconnected to transmission interface 14 and communication medium 15 via switching device 40. The switching device 40 allows multiple uses of telephone line 15. Alternatively dedicated lines for the connectors may be provided.

When a technician is at a customer's site it may be necessary for the technician to contact the central office or some other representative of the vendor. Using the telephone handset connector 16 the technician can simply plug in a telephone handset 17. This permits the technician to plug into telephone handset connector 16 and contact the vendor in a convenient manner. Similarly, the technician may wish to use a lap-top or other portable type computer to access information within device 10 and/or communicate with the vendor. The present invention provides computer connector 18 for this alternative. Again, through the provision of this entry point it is not necessary to interfere with or bother the customer for such communication.

As will be explained in greater detail below, communication device 10 includes a plurality of menu driven programs stored in the reprogrammable memory 34. Upon certain selections a message will be automatically forwarded over the telephone line to the appropriate representative of the vendor. Use of switching device 40 thus allows multiple use of the communication medium 15 connected to transmission interface 14.

Lastly, RIC connector 20 can be integrated into the system in a variety of arrangements. If the reproduction device 22 includes self-testing capabilities which are accessible to the exterior world, they may be routed through RIC connector 20 which is then routed through the telephone line associated with transmission interface 14 for transmission to the vendor's office. Alternatively, data generated from the self-diagnostic routines on-board the reproduction device 22 may be input into microprocessor 32 for further processing whereafter the processed data is forwarded to the vendor's office through the telephone line associated with transmission interface 14.

Through the above elements, the ease with which a service technician can communicate with the vendor's office is greatly enhanced. Further, the interaction between a customer and vendor is also greatly enhanced.

A typical manner in which a customer would communicate with a vendor is by first selecting the purpose of the communication via a menu displayed on display screen 12. This menu is generated from programs stored in reprogrammable memory 34. The programs stored will correlate to the particular reproduction device 22 with which it is associated. It is to be appreciated that programs may be stored in communication device 10 such that one communication device 10 is useful for a plurality of reproduction devices.

The programs stored in reprogrammable memory 34 may be stored during an initial set-up of the communication device. However, it is to be appreciated that a computer 19 computer connector 18 can also access reprogrammable memory 34 whereby these programs may be altered. It is further to be appreciated that such reprogramming may be done remotely from the vendor's office over the communication medium 15. In the present invention various types of reprogrammed memories are contemplated including EEPROMs, EPROMs, flash memory, NVRAMs and SRAMs among others.

FIG. 3 shows one possible example of the type of program which may be stored in reprogrammable memory 34. It is to be appreciated that this program is used just for example purposes and numerous other options or parameters may be included in the stored programs.

Initially, the program operates to display 50 a screen 52 in a constant manner. The displayed screen includes a plurality of alternatives such as the ordering of supplies (1), arranging for service calls (2) or sales calls (3), entering of billing meter readings (4), trouble-shooting problems (5) for explanation to a service technician or the sending of preprogrammed messages (6). The program checks to see whether a selection of possible alternatives has been made 54. If no selection is made the program is simply looped back to maintain the displayed screen 52. Once a selection is made the program branches into subprograms 56–66 more particularly directed to the selected topic. In this example, a selection is made for the ordering of supplies 56. An inquiry is made as to whether the supplies are for black toner 68 an operator will indicate yes or no in a menu driven situation. When, black toner is not being ordered the program branches to whether paper is being ordered 70. When it is determined paper is being ordered (again by input by the operator in a menu driven manner), further inquiry is made as to the type of paper 72, 74, the quantity of paper 76 etc. Once the desired paper order is concluded an inquiry is then made as to whether additional ordering is desired 78. If additional ordering is desired an instruction will loop the program back for the next supply inquiry. If no additional ordering is to be done a message is generated identifying the sender, date of order and other pertinent information 82. The modem is used to connect to the appropriate telephone number whereby the order is sent to an appropriate vendor location.

Again, it is to be appreciated that the above explanation simply provides one example of how a program stored in reprogrammable memory 34 may be used to assist the interaction between the customer and vendor. Numerous other options or parameters may be entered into reprogrammable memory 34 depending on the requirements of the particular installation. For instance, should trouble-shooting not be desired, it may be eliminated or preprogrammed messages correlating to function keys F1–F4 can be programmed with frequently sent messages. The programming flexibility of the device has been previously mentioned whereby the device 10 may be reprogrammed remotely or it may be programmed by a technician by a computer through the computer connector interface 18.

FIG. 4 sets forth screens showing the menu driven operation explained in FIG. 3.

As another option in the present device if the ten (10) digit keypad is found to be inadequate, then a full QWERTY keyboard can be implemented. Also as previously noted, if a standard RIC interface is developed, then a RIC-compatible interface can be added that allowed the device to include machine NVM values when it transmits a customer's request for a service call.

The above described system has many advantages particularly directed to low volume copiers. The device provides convenience for the operator by not forcing the operator to undertake real time actions for non-critical situations.

The invention has been described with reference to the preferred embodiments. Obviously, modifications and alterations will occur to others upon reading and understanding the preceding detailed description. It is intended that the invention be construed as including all such alterations and modifications insofar as they come within the scope of the appended claims or the equivalents thereof.

Having thus described the preferred embodiment, the invention is now claimed to be:

1. An operator controlled interactive communication device for transmitting and receiving data, the communication device comprising:

a display integrated in the communication device, displaying messages generated within the communication device or received by the communication device from an external source;

an input device integrated in the communication device, arranged to input, by an operator, data to the communication device;

a communication transmission interface integrated in the communication device, to operatively connect a transmission medium to the communication device;

a telephone handset connector operatively connecting a telephone handset to the communication device for external communication over the transmission medium;

a computer connector operatively connecting a computer to the communication device for external communication over the communication transmission interface and for reprogramming of a reprogrammable memory of the communication device; and a remote interactive communication connector operatively connecting a remote interactive communication system within a machine being monitored, wherein the input device and remote interactive communication connector provide the communication device with a flexibility to be used with both a machine having a remote interactive communication system and a machine without a remote interactive communication system.

2. The communication device according to claim 1 wherein the reprogrammable memory is an EEPROM.

3. The communication device according to claim 1 wherein the reprogrammable memory stores programs which generate a menu driven program.

4. The communication device according to claim 1 further including a modem connected to a communication transmission interface, the handset connector, and computer connector for outputting data through the communication transmission interface.

5. The communication device according to claim 4 further including a switch in operative connection at one end to the communication transmission interface and at another end to the modem, telephone handset connector and computer connector, whereby selective connection to the transmission medium is achieved.

6. The communication device according to claim 1 wherein the transmission medium is at least one of a telephone line, a cable transmission line, a utility line, an optical transmission line and a RF communication system.

7. The communication device according to claim 1 wherein the remote interactive communication connector connects a reprographic machine including the remote interactive communication system.

8. The communication device according to claim 7 wherein the communication device is configured to transmit and receive data regarding the reprographic machine.

9. A communication method for operator controlled interactive communication for transmitting and receiving data, the communication method comprising the steps of:

displaying on a display messages generated within a communication device and received by the communication device from an external source;

inputting, by an operator, data to the communication device through an input device;

operatively connecting a transmission medium to the communication device through a communication transmission interface;

operatively connecting a telephone handset through a telephone handset connector to the communication device for external communication over the transmission medium;

operatively connecting a computer through a computer connector to the communication device for external communication over the communication interface and for reprogramming of a reprogrammable memory of the communication device; and operatively connecting a remote interactive communication system through a remote interactive communication connector to the communication device, wherein the input device and remote interactive communication connector provide the communication device with a flexibility to be used with both a machine having a remote interactive communication system and a machine without a remote interactive communication system.

10. The method according to claim 9 further including reprogramming the reprogrammable memory from an external location.

11. The method according to claim 9 further including reprogramming the reprogrammable memory by a computer connected to the communication device through the computer connector.

12. The method according to claim 9 further including switching connection to the transmission medium between the telephone handset connector, computer connector and a modem.

13. A communication device for transmitting and receiving data concerning a plurality of associated reprographic machines, the communication device comprising:

a display element integrated in the communication device for displaying messages generated within the communication device or received by the communication device from an external source;

an input device integrated in the communication device, the input device used to input data by an operator to the communication device;

a communication transmission interface integrated in the communication device to operatively connect a transmission medium to the communication device;

a telephone handset connector for operatively connecting a telephone handset to the communication device for external communication over the communication interface;

a first plurality of instructions which correspond to messages transmitted from a first type of the plurality of reprographic machines;

a reprogrammable memory integrated in the communication device, the reprogrammable memory storing the first plurality of instructions, wherein when messages transmitted from the first type of the plurality of reprographic machines are observed by the operator and input to the communication device, the stored instructions corresponding to the messages are operated;

a second plurality of instructions stored in the reprogrammable memory, which correspond to messages transmitted from a second type of the plurality of reprographic machines, having remote interactive communications;

a remote interactive communication connector operatively connecting a remote interactive communication system within the second type of reprographic machine, such that internal operations of the second type of the plurality of reprographic machines can be sent through the communication device to an external site over the transmission medium;

a computer connector for operatively connecting a computer to the communication device for external communication by the transmission medium and for reprogramming of the reprogrammable memory of the communication device; and a switch controllably connecting the telephone handset connector, computer connector and a modem to the communication transmission interface.

14. The communication device according to claim 13 wherein the transmission medium is radio frequency signals.

15. The communication device according to claim 13 further including a power connection integrated in the communication device to power the communication device from a common wall outlet.

* * * * *